United States Patent
Ryne et al.

(10) Patent No.: US 6,389,924 B1
(45) Date of Patent: May 21, 2002

(54) STEERING COLUMN FOR MOTOR VEHICLE

(75) Inventors: Patrik M Ryne, Bay City, MI (US); Eric David Pattok, Velpke (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/730,228

(22) Filed: Dec. 5, 2000

(51) Int. Cl.[7] .............................. B62D 1/18; B62D 5/04; F16H 35/00

(52) U.S. Cl. ...................... 74/493; 74/388 PS; 180/443; 180/444

(58) Field of Search ........................... 74/493, 388 PS; 180/443, 444; 403/334, 335, 338

(56) References Cited

U.S. PATENT DOCUMENTS

| | | | | |
|---|---|---|---|---|
| 4,650,019 A | * | 3/1987 | Yanai et al. | 180/444 |
| 5,482,128 A | * | 1/1996 | Takaoka et al. | 180/444 |
| 5,664,459 A | * | 9/1997 | Muhleck et al. | 74/424.87 |
| 5,738,183 A | * | 4/1998 | Nakajima et al. | 180/444 |
| 6,129,648 A | * | 10/2000 | Tanioka et al. | 475/331 |

* cited by examiner

Primary Examiner—David A. Bucci
Assistant Examiner—Justin Stefanon
(74) Attorney, Agent, or Firm—Edmund P. Anderson

(57) ABSTRACT

A motor vehicle steering column having thereon an electric power assist apparatus including a tubular mast jacket, a structural housing, a socket in an end wall of the housing consisting of an annular seat and a cylindrical guide wall, and an annular plate attached to the mast jacket. The plate plugs into the socket and bears flush against the seat with the edge of the plate fitted in the cylindrical guide wall of the socket so that the centerlines of the mast jacket and the housing are precisely aligned. A C-shaped retainer in an annular groove in the cylindrical guide wall overlaps the plate to prevent dislodgment of the mast jacket from the housing. The retainer has a beveled shoulder which bears on an edge of the groove and converts circumferential expansion of the retainer into longitudinal thrust on the plate to eliminate lash between the plate and the housing.

5 Claims, 2 Drawing Sheets

STEERING COLUMN FOR MOTOR VEHICLE

TECHNICAL BACKGROUND

This invention relates to a motor vehicle steering column having thereon an electric power assist apparatus.

BACKGROUND OF THE INVENTION

A typical motor vehicle steering column includes a tubular mast jacket supported on a body of the motor vehicle, a steering shaft supported on the mast jacket for rotation about a longitudinal centerline of the mast jacket, and a steering handwheel attached to the top of the steering shaft. Manual effort applied at the steering handwheel is transferred by the steering shaft to a steering gear of the motor vehicle connected to the bottom of the steering shaft. A "column mounted" electric power assist apparatus for supplementing the manual effort applied at the steering handwheel includes a housing rigidly attached to the bottom of the mast jacket, an electric motor supported on the housing, reduction gears in the housing for transferring the output torque of the electric motor to the steering shaft, a transducer in the housing for determining the magnitude and direction of the applied manual effort, and an electronic control for turning the electric motor on and off. For maximum structural integrity and functional reliability, it is imperative that the longitudinal centerline of the steering column be precisely aligned with a longitudinal centerline of the housing of the assist apparatus. To that end, it is known to weld an end plate to the bottom of the mast jacket, to guide the end plate to a seated position on the housing with guide pins on the housing and guide holes in the end plate, and to bolt the end to the housing. Manufacturers, however, continue to seek improved steering columns in which precise alignment of the housing of the electric power assist apparatus relative to the mast jacket is achieved reliably and at less manufacturing cost.

SUMMARY OF THE INVENTION

This invention is a new and improved motor vehicle steering column having thereon a column mounted electric power assist apparatus including a tubular mast jacket, a structural housing of the assist apparatus, a socket in an end wall of the housing consisting of an annular seat in a plane perpendicular to a longitudinal centerline of the housing and a cylindrical guide wall around the annular seat machined concentric with the longitudinal centerline of the housing, and an annular end plate rigidly attached to the bottom of the mast jacket in a plane perpendicular to a longitudinal centerline thereof having a circular edge machine concentric with the longitudinal centerline of the mast jacket after the end plate is attached. The end plate plugs into the socket and bears flush against the seat with the circular edge of the end plate fitted closely in the cylindrical guide wall of the socket so that the longitudinal centerlines of the mast jacket and the housing are precisely aligned. A C-shaped retained in an annular groove in the cylindrical guide wall overlaps the end plate to prevent dislodgement of the mast jacket from the housing, the retained has a beveled shoulder which bears on and edge of the groove and converts resilient circumferential expansion of the retainer into longitudinal thrust on the end plate against the seat of the socket thereby to eliminate lash between the end plate and the housing in the direction of the longitudinal centerlines.

DESCRIPTION OF THE PREFERRED EMBODIMENT

Figure 1:
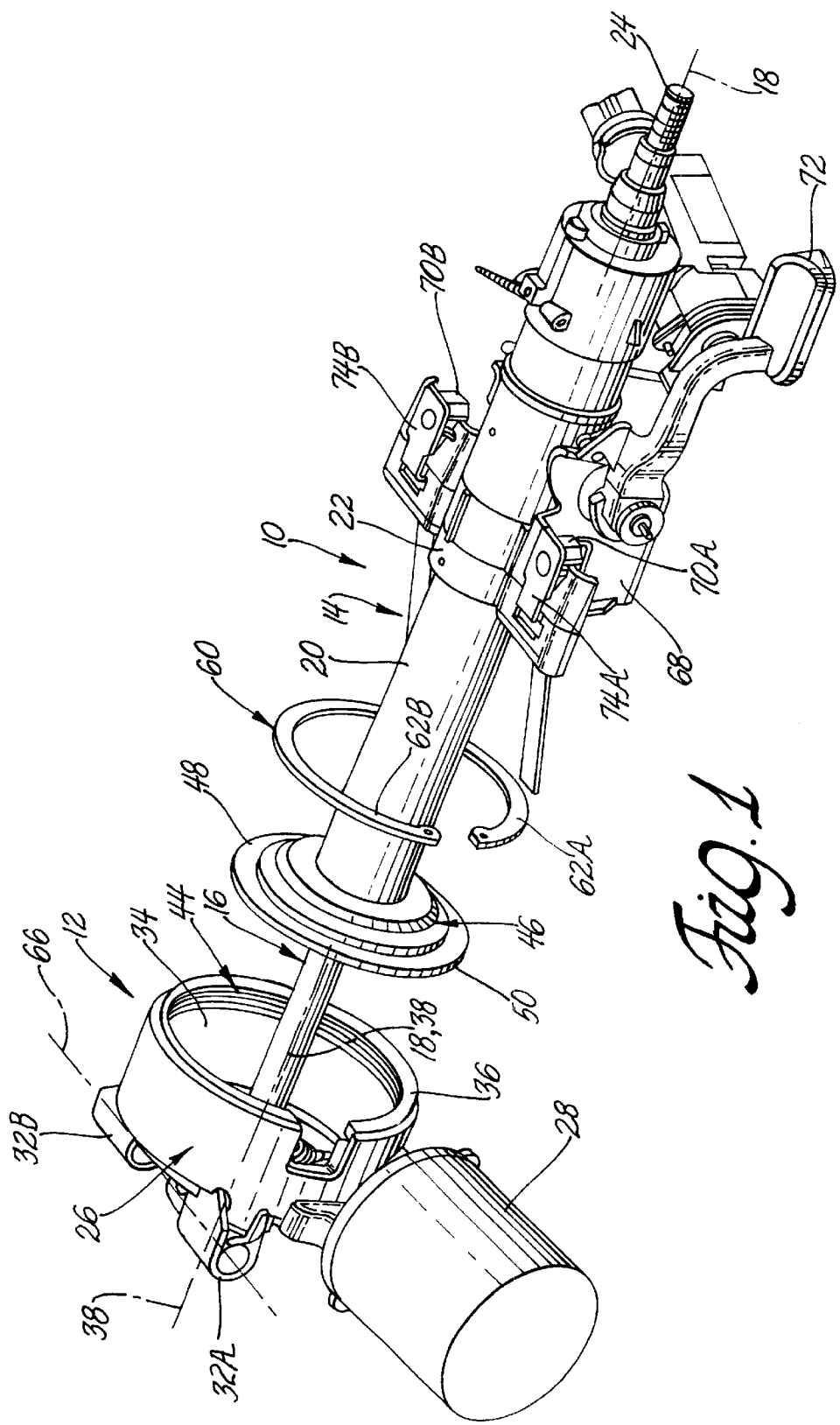
FIG. 1 is a fragmentary exploded perspective of a motor vehicle steering column according to this invention.

Referring to FIG. 1, a motor vehicle steering column 10 according to this invention includes a column mounted electric power assist apparatus 12, a mast jacket 14, and a steering shaft 16 supported on the mast jacket for rotation about a longitudinal centerline 8 of the mast jacket. The mast jacket includes a tubular lower portion 20 and a tubular upper portion 22 supported on the lower portion for linear translation in the direction of the centerline 18. A steering handwheel, not shown, is rigidly attached to an upper end 24 of the steering shaft.

Figure 2:
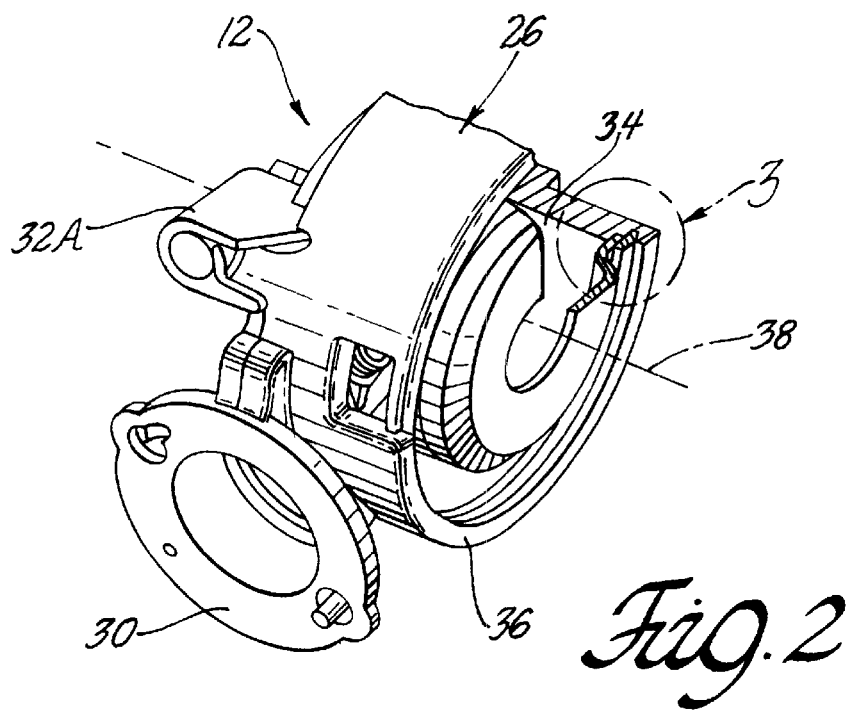
FIG. 2 is a broken-away view of a structural housing of an electric power assist apparatus of the motor vehicle steering column according to this invention.

The column mounted electric power assist apparatus 12 includes a structural housing 26 and an electric motor 28 rigidly attached to the housing at a mounting flange 30, FIG. 2. The housing 26 includes a pair of integral external tubular mounting lugs 32A,32B and an internal chamber 34 open through an end wall 36 of the housing in a plane perpendicular to a longitudinal centerline 38 of the housing. An annular seat 40 in a plane perpendicular to the centerline 38 of the housing and a cylindrical guide wall 42 machined to precise concentricity relative to the centerline 38 constitute a socket 44 on the housing in the end wall 36.

An annular end plate 46 is rigidly attached, preferably by fusion bonding, e.g. arc welding or spin welding, to the bottom of the mast jacket 14 at the exposed end of the tubular lower portion 20 of the mast jacket. The end plate includes an annular flat flange portion 48 in a plane perpendicular to the longitudinal centerline 18 of the mast jacket having an outer circular edge 50. After the end plate 46 is attached to the tubular lower portion 20 of the mast jacket, the outer circular edge 50 of the flange portion is machined to a diameter only slightly smaller than the diameter of the cylindrical guide wall 42 of the socket 44 and to precise concentricity relative to the longitudinal centerline 18 of the mast jacket.

Figure 3:
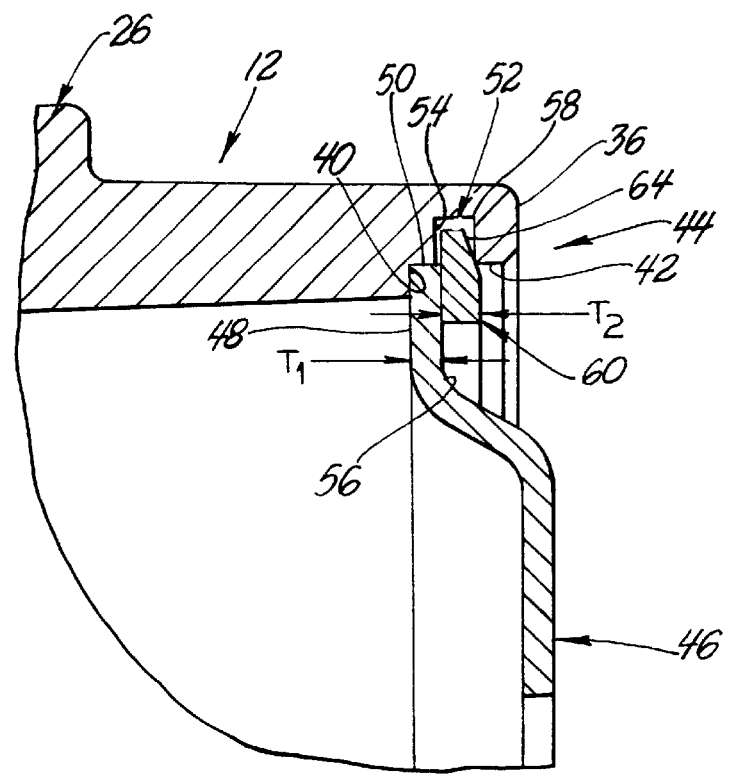
FIG. 3 is an enlarged view of the portion of FIG. 2 identified by the reference circle 3 in FIG. 2.

The housing 26 of the assist apparatus 12 is united with the mast jacket 14 by plugging the end plate 46 into the socket 44. The cylindrical guide wall 42 closely surrounds the outer edge 50 of the flange portion of the end plate and cooperates therewith in guiding the end plate to a seated position, FIG. 3, in which the flange portion bears flush against the annular seat 40 with the longitudinal centerlines 38,18 of the housing and the mast jacket in precise colinear alignment. At the same time, the bottom of the steering shaft 16 is connected to a steering gear, not shown, of the motor vehicle through a support in the internal chamber 34 of the assist apparatus housing so that manual effort applied at the steering handwheel is transferred to the steering gear.

A transducer, not shown, in the internal chamber 34 monitors the direction and magnitude of the manual effort applied at the steering handwheel and provides a corresponding electronic signal to an electronic control module which turns the electric motor 28 on and off accordingly. Reduction gears, not shown, in the internal chamber 34 transfer torque from an output shaft of the electric motor to the steering shaft to supplement the manual effort applied at the steering handwheel. Importantly, the precise alignment of the longitudinal centerlines 18,38 attained simply and automatically when the end plate 46 is plugged into the socket 44 to its seated position maximizes the structural integrity of the steering column and the functional reliability of the column mounted electric power assist apparatus 12.

The cylindrical guide wall 42 of the socket 44 is interrupted by an annular groove 52 in the housing 26. A first side 54 of the groove 52 is separated in the direction of the centerline 38 of the housing from the seat 40 by a span which is slightly less than a thickness dimension "$T_1$", FIG. 3, of the flange portion 48 of the end plate so that an outboard side 56 of the flange portion is slightly above the first side of the groove in the seated position of the end plate. A second side 58 of the annular groove 52 is separated from the first side by less than a thickness dimension "$T_2$" of a flat C-shaped retainer 60. The retainer includes a pair of flexible arms 62A, 62B and a beveled shoulder 64 along an outer edge of the retainer.

With the end plate 46 in its seated position in the socket 44, the arms 62A,62B of the retainer are flexed resiliently toward each other to reduce the diameter of the retainer to less than the diameter of the guide wall 42 so that the retainer fits within the guide wall flush against the outboard surface 56 of the flange portion 48 and expands circumferentially into the annular groove 52 when the arms are released. At the same time, the beveled shoulder 64 bears against and slides along the edge of the annular groove where the second side 58 thereof intersects the cylindrical guide wall to convert the expansion of the retainer into thrust on the flange portion toward the seat 40. The retainer expands until it overlaps the flange portion and the annular groove 52 with the flange portion thrust firmly and flush against the seat 40. Dislodgment of the end plate 46 from the socket 44 is thus foreclosed and all lash between the assist apparatus housing 26 and the mast jacket 14 in the direction of the centerlines 18,38 is eliminated with the simple step of releasing the arms 62A,62B of the retainer. Because the assist apparatus housing 26 is secured to the mast jacket 14 without threaded fasteners, the steering column 10 according to this invention is less susceptible to misalignment between the centerlines 18,38 than comparable prior steering columns in which improper tightening of such threaded fasteners is known to contribute to such misalignment.

The steering column 10 is supported on a motor vehicle body, not shown, at the tubular bosses 32A,32B on the assist apparatus housing for up and down pivotal movement about a lateral axis 66 to adjust the vertical position of the steering handwheel on the steering shaft. A support bracket 68 surrounds the tubular upper portion 22 of the mast jacket and is attached to the vehicle body above the steering column through a pair of capsules 70A,70B. A clamp between the mast jacket and the support bracket is actuated by a lever 72 to secure the mast jacket to and release the mast jacket from the support bracket. With the mast jacket clamped to the support bracket, an impact on the steering handwheel reacts to the vehicle body through the upper tubular portion 22 of the mast jacket and initiates separation of the mounting bracket 68 from the stationary capsules 70A,70B. The tubular upper portion of the mast jacket is thus released for linear translation relative to the tubular lower portion through a collapse stroke against a resistance attributable to plastic deformation of a pair of flat metal straps 74A,74B anchored to the vehicle body whereby a fraction of the kinetic energy of the impact is converted into work.

While only a preferred embodiment of this invention has been described herein, it will be appreciated that other forms could be readily adapted by one skilled in the art. Accordingly, the scope of this invention is to be considered limited only by the following claims.

The embodiments of the invention in which an exclusive property or privilege is claimed are defined as follows:

1. A motor vehicle steering column comprising:

a tubular mast jacket, a structural housing for a power assist apparatus including an internal chamber exposed through an end wall of the structural housing in a plane perpendicular to a longitudinal centerline of the structural housing, a socket in the end wall of the structural housing including an annular seat in a plane perpendicular to the longitudinal centerline of the structural housing and a cylindrical guide wall around the annular seat machined concentric with longitudinal centerline of the structural housing, an annular end plate rigidly attached to the bottom of the tubular mast jacket in a plane perpendicular to a longitudinal centerline of the tubular mast jacket having a circular edge of a flange portion of the end plate machined concentric with the longitudinal centerline of the tubular mast jacket after the end plate is attached to the tubular mast jacket, the flange portion of the end plate bearing flush against the seat of the socket in the end wall of the structural housing with the circular edge thereof fitted closely against the cylindrical guide wall of the socket so that the longitudinal centerline of the tubular mast jacket coincides with the longitudinal centerline of the structural housing, and a retainer means operable without screw-threaded fasteners to prevent dislodgment of the end plate from the socket in the structural housing and to concurrently thrust the flange portion of the end plate against the seat of the socket to eliminate lash between the structural housing and the tubular mast jacket in the direction of the longitudinal centerlines of the structural housing and the tubular mast jacket.

2. The motor vehicle steering column recited in claim 1 wherein the retainer means comprises:

an annular groove in the structural housing interrupting the cylindrical guide wall of the socket having a first side in a plane perpendicular to the longitudinal centerline of the structural housing separated from the seat of the socket by a span less than the thickness of the flange portion of the end plate and a second side parallel to the first side, a flat C-shaped retainer circumferentially compressed in the annular groove and overlapping the flange portion of the end plate to prevent dislodgment of the tubular mast jacket from the structural housing, and a beveled shoulder on the retainer bearing against an edge of the second side of the annular groove and cooperating therewith in converting the circumferential expansion of the retainer into thrust on the flange portion of the end plate against the seat of the socket thereby to eliminate lash between the mast jacket and the structural housing in the direction of the longitudinal centerlines of the mast jacket and the structural housing.

3. A method of making a motor vehicle steering column comprising the steps of:

forming a tubular mast jacket, forming a structural housing for a power assist apparatus including an internal chamber exposed through an end wall of the structural housing in a plane perpendicular to a longitudinal centerline of the structural housing, forming a socket in the end wall of the structural housing including an annular seat in a plane perpendicular to the longitudinal centerline of the structural housing and a cylindrical guide wall around the seat machined concentric with longitudinal centerline of the structural housing, forming an annular end plate having a flat annular flange portion therearound, rigidly attaching the annular end plate to the bottom of the tubular mast jacket with the flange portion in a plane perpendicular to a longitudinal centerline of the tubular mast jacket, machining a circular edge of the flange portion concentric with the longitudinal centerline of the tubular mast jacket after the end plate is attached to the tubular mast jacket, plugging the end plate into the socket until the flange portion bears flush against the seat of the socket with the circular edge of the flange portion fitted closely against the cylindrical guide wall of the socket so that the longitudinal centerline of the tubular mast jacket coincides with the longitudinal centerline of the structural housing, and retaining the end plate in the socket with a retainer means operable without screw-threaded fasteners to prevent dislodgment of the end plate from the socket and to concurrently thrust the flange portion of the end plate against the seat of the socket to eliminate lash between the structural housing and the tubular mast jacket in the direction of the longitudinal centerlines of the structural housing and the tubular mast jacket.

4. The method of making a motor vehicle steering column recited in claim 3 wherein the step of retaining the end plate in the socket with a retainer means comprises the steps of:

forming an annular groove in the structural housing in the cylindrical guide wall of the socket having a first side in a plane perpendicular to the longitudinal centerline of the structural housing separated from the seat of the socket by a span less than the thickness of the flange portion of the end plate and a second side parallel to the first side, forming a flat C-shaped retainer with a beveled shoulder, circumferentially compressing the retainer to a diameter less then the diameter of the cylindrical guide wall of the socket and aligning the retainer with the annular groove in the cylindrical guide wall and flush against the flange portion of the end plate, and releasing the retainer for circumferential expansion into the annular groove with the beveled shoulder of the retainer hearing against an edge of the second side of the annular groove so that the retainer overlaps the annular groove and the flange portion of the end plate to prevent dislodgment of the tubular mast jacket from the structural housing and the beveled shoulder cooperates with the edge of the second side of the annular groove in converting the circumferential expansion of the retainer into thrust on the flange portion of the end plate against the seat of the socket thereby to eliminate lash between the mast jacket and the structural housing in the direction of the longitudinal centerlines of the mast jacket and the structural housing.

5. The method of making a motor vehicle steering column recited in claim 3 wherein the step of rigidly attaching an annular end plate to the bottom of the tubular mast jacket comprises the step of:

fusion bonding the annular end plate to the bottom of the tubular mast jacket.

fusion bonding the annular end to the bottom of the tubular mast jacket.

* * * * *